United States Patent [19]

Evans et al.

[11] Patent Number: 5,042,234
[45] Date of Patent: Aug. 27, 1991

[54] COLLAGEN FILM AND NETTING PACKAGING SYSTEM AND METHOD

[75] Inventors: Alfred J. Evans; Frances Sarginger, both of Raleigh, N.C.

[73] Assignee: Delaware Capital Formation Inc., Apex, N.C.

[21] Appl. No.: 410,333

[22] Filed: Sep. 20, 1989

Related U.S. Application Data

[63] Continuation-in-part of Ser. No. 352,964, May 17, 1989, abandoned.

[51] Int. Cl.$^5$ .......................... B65B 3/16; B65B 25/06
[52] U.S. Cl. ........................................ 53/523; 53/170; 53/576; 452/30
[58] Field of Search ............... 53/170, 548, 138 A, 53/138 R, 523, 258, 173, 550, 450, 436, 576, 577, 575; 17/33, 34

[56] References Cited

U.S. PATENT DOCUMENTS

| | | | |
|---|---|---|---|
| 3,108,318 | 10/1963 | Miller et al. | 17/35 X |
| 3,214,883 | 11/1965 | Omori | 53/550 |
| 3,732,113 | 5/1973 | Walters | 53/258 X |
| 3,805,480 | 4/1974 | Cherio et al. | 53/577 X |
| 3,964,236 | 6/1976 | Smith | 17/41 X |
| 4,047,360 | 9/1977 | Minaev et al. | 53/173 X |
| 4,438,545 | 3/1984 | Kupcikevicius et al. | 17/343 X |
| 4,442,568 | 4/1984 | Petry | 53/576 X |
| 4,467,499 | 8/1984 | Beckman et al. | 17/34 X |
| 4,734,956 | 4/1988 | Frey et al. | 53/170 X |
| 4,750,239 | 6/1988 | Niedecker | 17/34 |
| 4,768,261 | 9/1988 | Nakamura | 17/41 |
| 4,796,332 | 1/1989 | Stanley | 17/34 |

FOREIGN PATENT DOCUMENTS 0175173 3/1986 European Pat. Off. .
2558793 7/1977 Fed. Rep. of Germany .

OTHER PUBLICATIONS

Technopak$^R$ Brochure "Clips und fertig" (no Date).

Primary Examiner—James F. Coan
Attorney, Agent, or Firm—Allegretti & Witcoff, Ltd.

[57] ABSTRACT

Apparatus for simultaneously placing a collogen film from a flat sheet of collogen film about the outside circumference of a product and placing netting about the outside circumference of the product. In one aspect, the apparatus comprises a base, a manifold assembly, a center product discharge tube, a collogen forming collar, a discharge horn and a netting support cylinder. Additionally, the apparatus may comprise a netting de-rucker, a discharge conveyor a product end clipper and other components and elements. The manifold assembly is mounted to the base, and the center product discharge tube extends from the manifold assembly. The collogen forming collar forms the flat sheet into a cylindrical shape, is concentric with the discharge tube and is mounted in association with the discharge tube. The discharge horn extends along a portion of the discharge tube away from the manifold assembly and is mounted in association with the discharge tube. The netting support cylinder is concentric with and outside the discharge tube and discharge horn, and is mounted in association with the discharge tube and discharge horn. The netting support cylinder and discharge horn, away from the manifold assembly, terminate substantially coterminally. Product material flows through the manifold assembly and product discharge tube and collogen film and netting is simultaneously placed about the product as product material exits the product discharge tube.

8 Claims, 19 Drawing Sheets

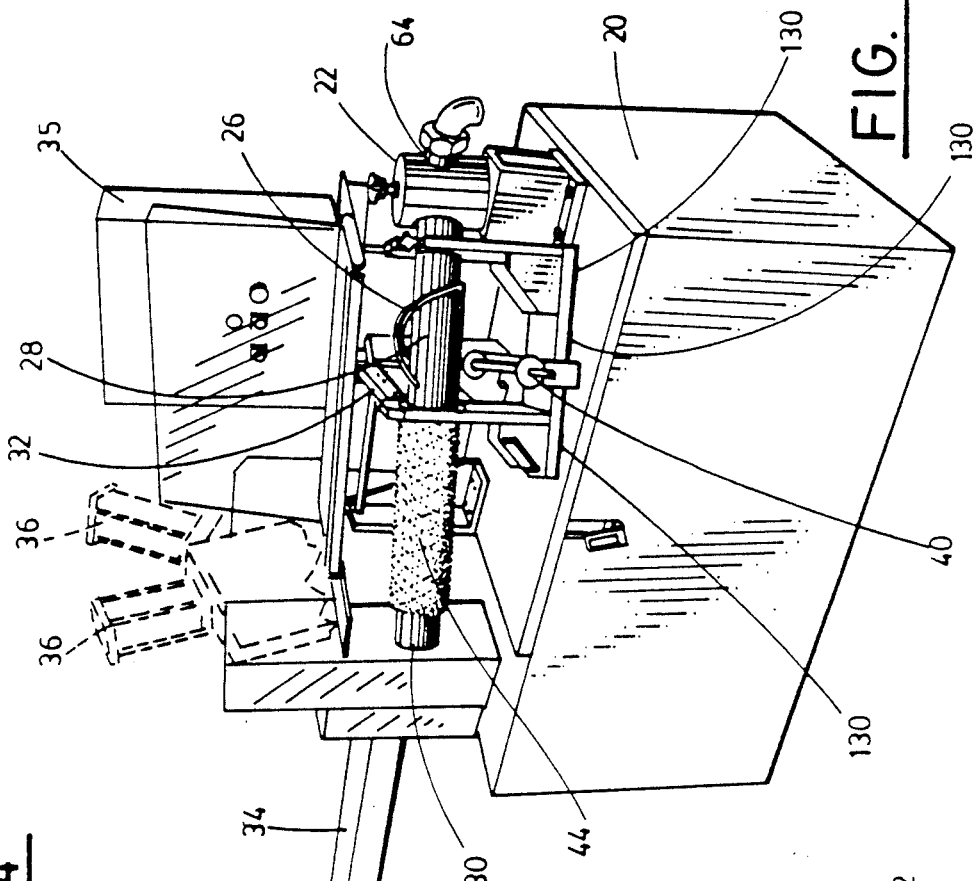
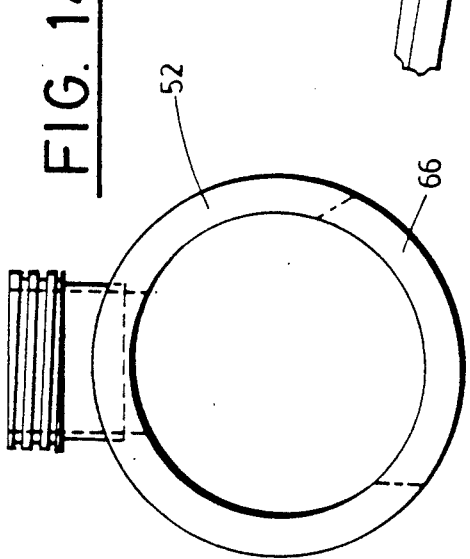
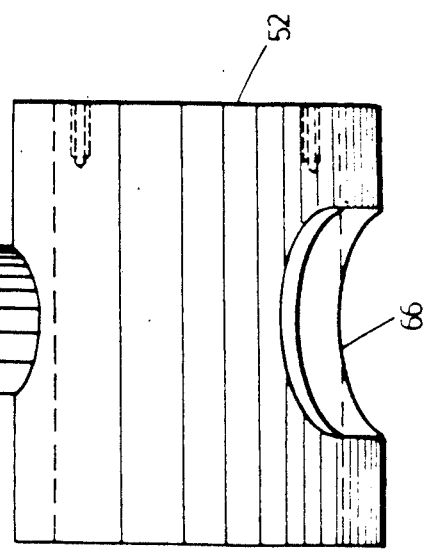

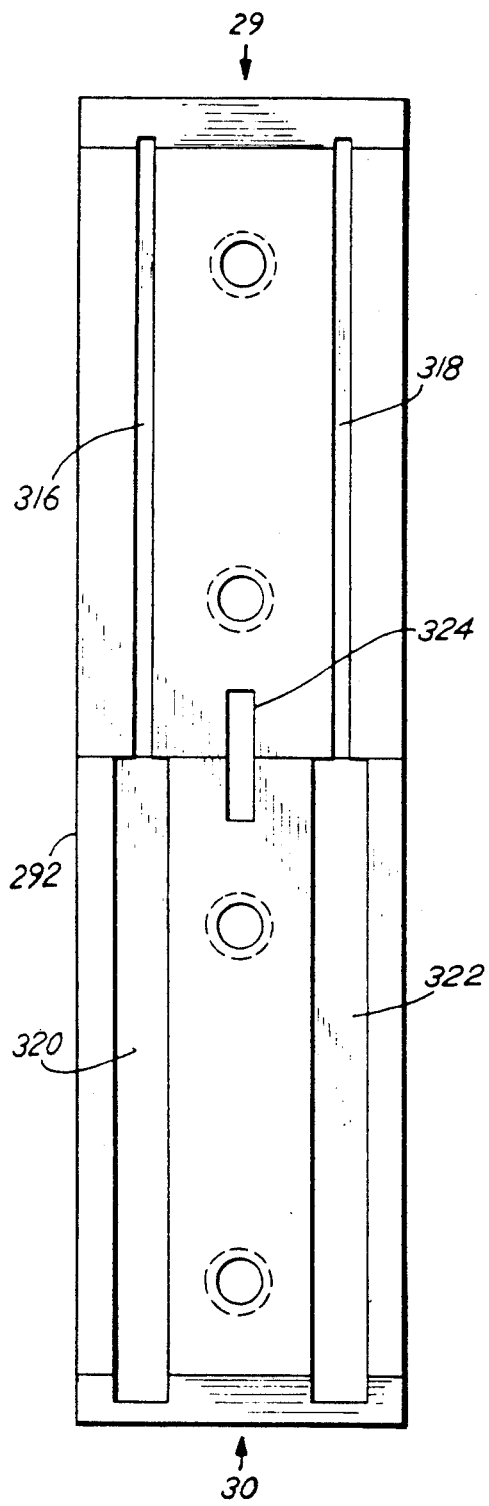
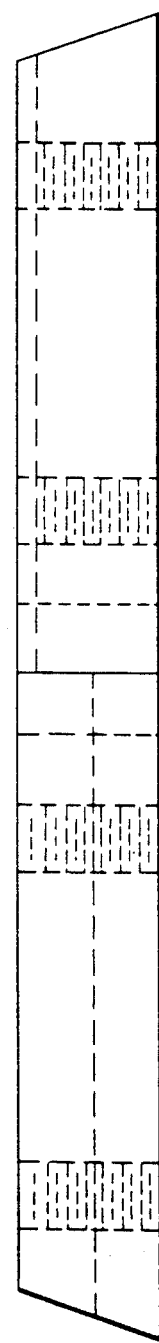
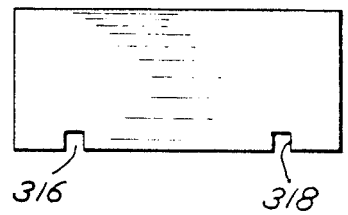
Fig. 29
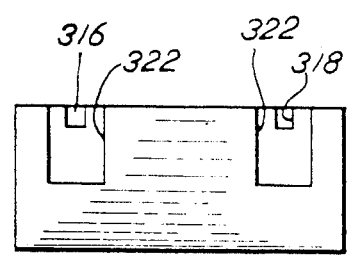
Fig. 30
Fig. 27   Fig. 28

COLLAGEN FILM AND NETTING PACKAGING SYSTEM AND METHOD

This is a continuation-in-part of patent application Ser. No. 352,964 filed May 17, 1989, now abandoned.

BACKGROUND OF THE INVENTION

This invention relates to chub forming apparatus.

In the past, a variety of chub forming machinery has existed, which generally includes some means for pumping comminuted material such as sausage meats, some means for packaging such material in tubing, and some means for dividing the packaged material into individual chubs. Tipper Tie, a Dover Industries company, has been a leader in the advancement of the art as to such machinery. In a typically advanced Tipper Tie TM machine, comminuted material is pumped into a stuffing horn assembly comprising one or more stuffing horns about which casing has been manually placed. The material and casing exits a casing brake mechanism which provides tension to the casing and controls product size. Adjacent the casing brake mechanism, a highly automated clipper mechanism intermittently voids portions of the cased material, applies pairs of metal clips to the voided portions, and cuts between the clips to complete the formation of chub products.

In contrast with the advances in the formation of chub products with casing, a common practice in the formation of net enclosed products is manual production. As most pertinent to the invention, comminuted material is pumped through a horn and both collagen material and netting are fed about the comminuted material. The advance of the netting and collagen material is controlled manually, as is voiding and clipping. Alternately collagen film is manually wrapped about whole muscle products, which are then manually pushed through a chute into netting. With pumped comminuted material, the situation is complicated by the use of the collagen material, in that the collagen material is formed into a loose cylinder having loose longitudinal edges. These edges are intended to overlap uniformly, but are not fastened to each other. The result is that the overlap is not uniform, and the collagen material often gaps along its edges, exposing internal material to the air and foreign matter. The resulting product is often not suited for commercial distribution and sale. The manual nature of the production also leads to disparities in product size, weight and condition, and substantial expenditure of labor and materials.

SUMMARY OF THE INVENTION

An object of the present invention is to automate the manual processes of the prior art in a manner which is efficient of manpower, other physical power, materials and labor.

Another object of the invention is to provide apparatus which is facile of operation and service.

Another object of the invention is to provide semi-automated apparatus which eliminates to as high a degree as possible collagen film spread or tear, without involving glue or similar attachment of collagen film edges.

Another object of the invention is to provide automated apparatus from which product is discharged which is highly uniform in diameter, length, and fill.

Accomplishing these objects and others, the invention is, in a principal aspect, apparatus for simultaneously placing a collagen film from a flat sheet of collagen film about the outside circumference of a product and placing netting about the outside circumference of the product. In a principal aspect, the apparatus comprises a base, a manifold assembly, a center product discharge tube, a collagen forming collar, a discharge horn and a netting support cylinder. Additionally, the apparatus may comprise a netting derucker, a discharge conveyor, a product end clipper and other components and elements. The manifold assembly is mounted to the base, and the center product discharge tube extends from the manifold assembly. The collagen forming collar forms the flat sheet into a cylindrical shape, is concentric with the discharge tube and is mounted in association with the discharge tube. The discharge horn extends along a portion of the discharge tube away from the manifold assembly and is mounted in association with the discharge tube. The netting support cylinder is concentric with and outside the discharge tube and discharge horn, and is mounted in association with the discharge tube and discharge horn. The netting support cylinder and discharge horn, away from the manifold assembly, terminate substantially coterminally. Product material flows through the manifold assembly and product discharge tube and collagen film and netting is simultaneously placed about the product as product material exits the product discharge tube.

The features and objects of the invention, and additional features and advantages are more fully described in relation to the preferred embodiment of the invention. The description follows.

BRIEF DESCRIPTION OF THE DRAWING

The preferred embodiments of the invention are described in detail in the following Detailed Description of the Preferred Embodiments. The detailed description includes reference to the accompanying drawing. For ease of reference, the drawing is briefly described as follows:

FIG. 1 of the drawing is a perspective view of a first preferred embodiment of the invention, with a clipper shown in phantom for clarity, and with the mechanisms in service condition;

FIGS. 14 and 15 are external views of a manifold cylinder;

FIG. 27 is an end elevation view of a jaw member of the gathering jaw assembly;

FIG. 28 is a reverse side elevation view of the jaw member;

FIG. 29 is a top end view of the jaw member;

FIG. 30 is a bottom end view of the jaw member;

DETAILED DESCRIPTION OF THE PREFERRED EMBODIMENTS

The First Preferred Embodiment

Figure 2:
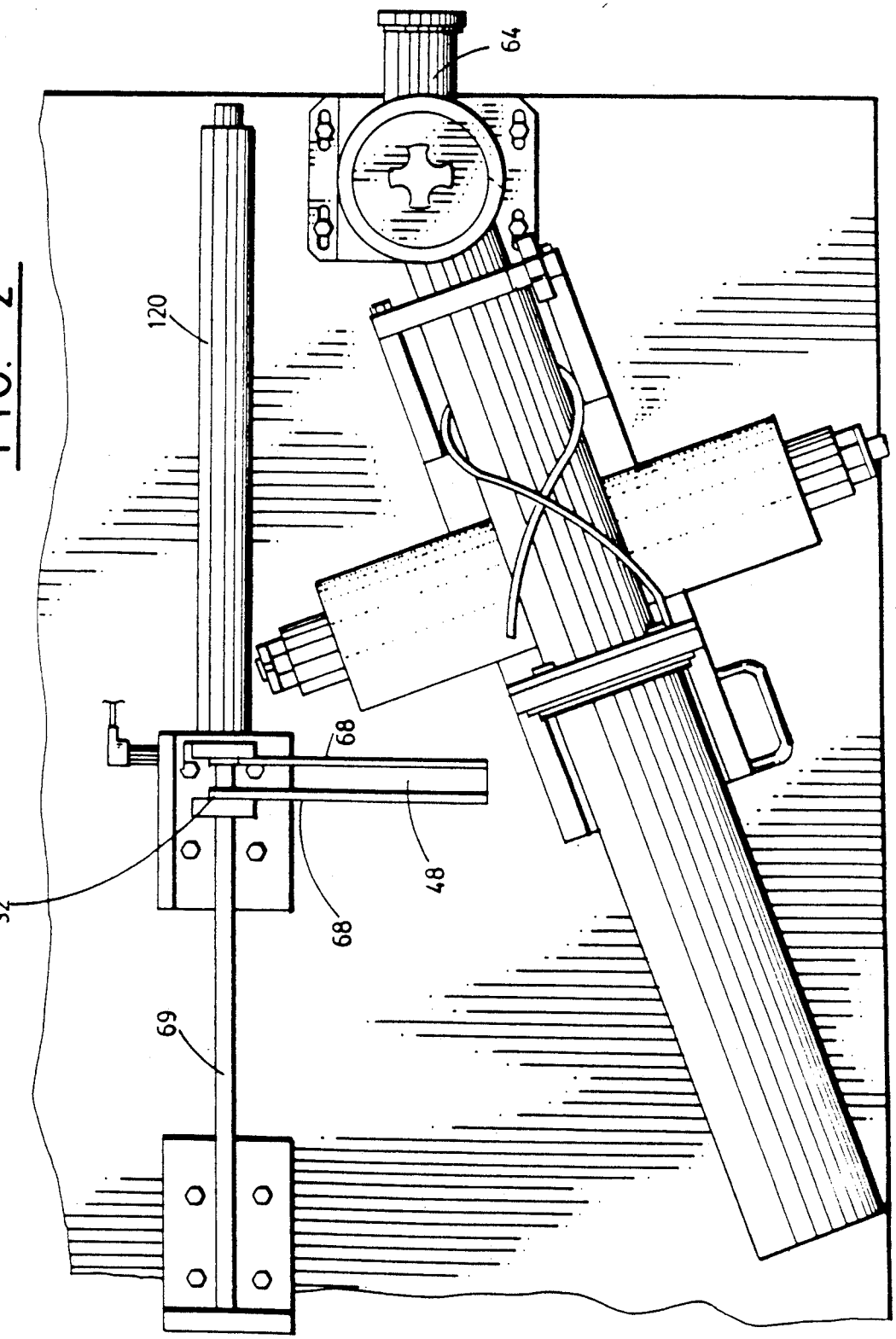
FIG. 2 is a plan view of a portion of the preferred embodiment of FIG. 1.
Figure 3:
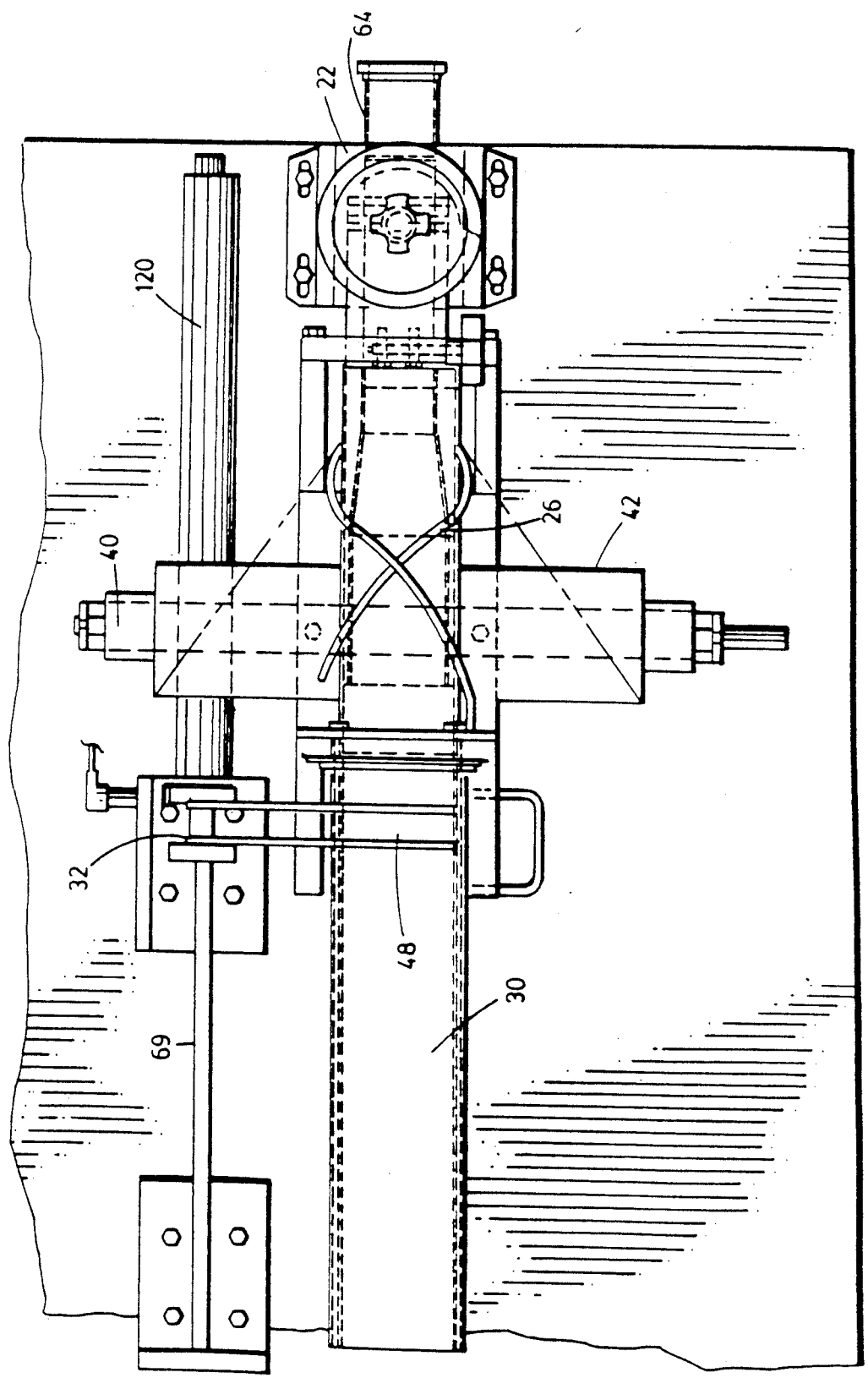
FIG. 3 is a plan view similar to FIG. 2, with the apparatus in in operating condition and position.
Figure 4:
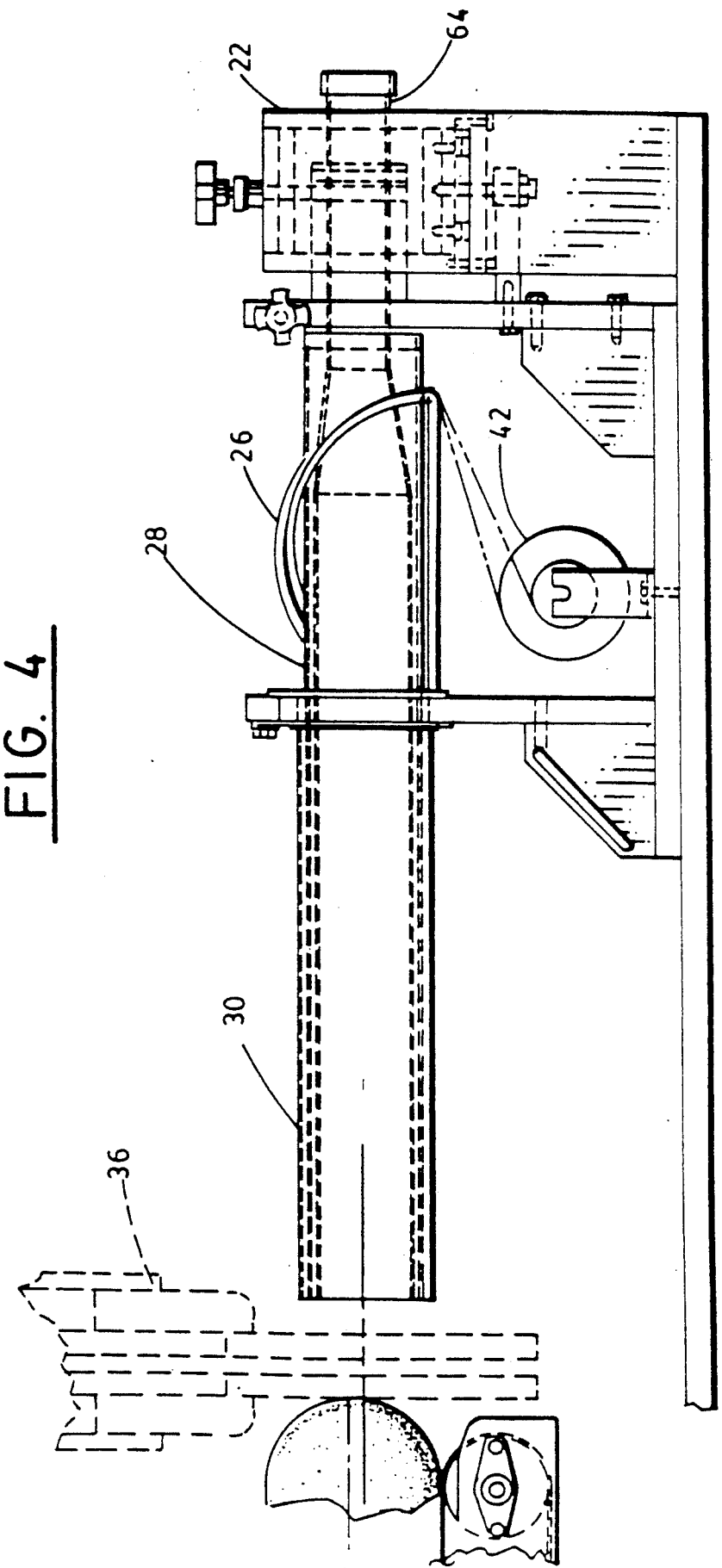
FIG. 4 is a side elevation of the apparatus as in FIG. 3, with the clipper shown in phantom.

Referring to FIG. 1, the first preferred embodiment of the invention constitutes apparatus comprising a base 20, a manifold assembly 22, a center product discharge tube 24 (shown in FIG. 5), a collagen forming collar 26, a discharge horn 28 and a netting support cylinder 30. Additionally, the apparatus comprises a netting derucker generally 32, a discharge conveyor 34, a product end clipper 36 and other components and elements such as guards and a control cabinet 35 as shown and to be described.

The manifold assembly 22 is mounted to the base 20, and the center product discharge tube 24 extends from the manifold assembly 22. The collagen forming collar 26 forms flat sheet from a roll mounted about a roller 40 into a cylindrical shape, is concentric with the discharge tube 24 and is mounted in association with the discharge tube 24.

The discharge horn 28 extends along a portion of the discharge tube 24 away from the manifold assembly 22 and is mounted in association with the discharge tube 24. The netting support cylinder 30 is concentric with and outside the discharge tube 24 and discharge horn 28, and is mounted in association with the discharge tube 24 and discharge horn 28.

The discharge horn 28 also has about its outer diameter a plastic sleeve which serves as a thermal barrier to aid in preventing sweating of the outside diameter. Sweating of the outside diameter of a horn is caused by cold meat fill being pumped inside the horn assembly, chilling the outside surface of the horn. Moisture contained in the air is caused to condense on the horn. If moisture were on the outside diameter of horn 28, the collagen film 42 would adhere to the horn and fracture when pulled by the product. The plastic tube on horn 28 prevents sweating of horn 28.

The netting support cylinder 30 and discharge horn 28, away from the manifold assembly 22, terminate substantially coterminally. Product material (shown exiting the discharge tube in FIG. 5) flows through the manifold assembly 22 and product discharge tube 24. Collagen film 42 and netting 44 is simultaneously placed about the product as product material exits the product discharge tube 24.

The clipper means, shown in phantom at 36, is located adjacent the product discharge tube 24 and discharge horn 28, opposite the manifold assembly 22. The clippers, which are conventional in other applications, intermittently void portions of the product upon exit of product from the product discharge tube 24 and clip product ends in the voided portions.

The netting derucker 32 derucks netting from the netting support cylinder 30. The derucking maintains the netting in close proximity to the end of the horn, and the proximity provides a uniform extraction force, to yield consistent product length and diameter. Derucking is accomplished by intermittent contact of derucker fingers 48 along portions of the netting followed by transport of the contacted netting portion along the netting support cylinder 30 away from the manifold assembly and toward product discharge.

The product discharge tube, discharge horn and netting support cylinder are mounted in association with the base and manifold assembly to swing between an operating position and a servicing position. The servicing position is that shown in FIGS. 1 and 2, in which the product discharge tube, discharge horn and netting support cylinder are swung away from the clipper 36, exposing the product discharge ends of the tube, horn and cylinder. The operating position is as shown in FIGS. 3, 4, 5 and 13.

Operation of the automated mechanisms of the first preferred apparatus are under the control of pneumatic cylinders and controls (not shown) which co-ordinate the mechanisms for desirable speed. The conveyor runs only when the pump is running and halts during gathering and clipping.

Figure 5:
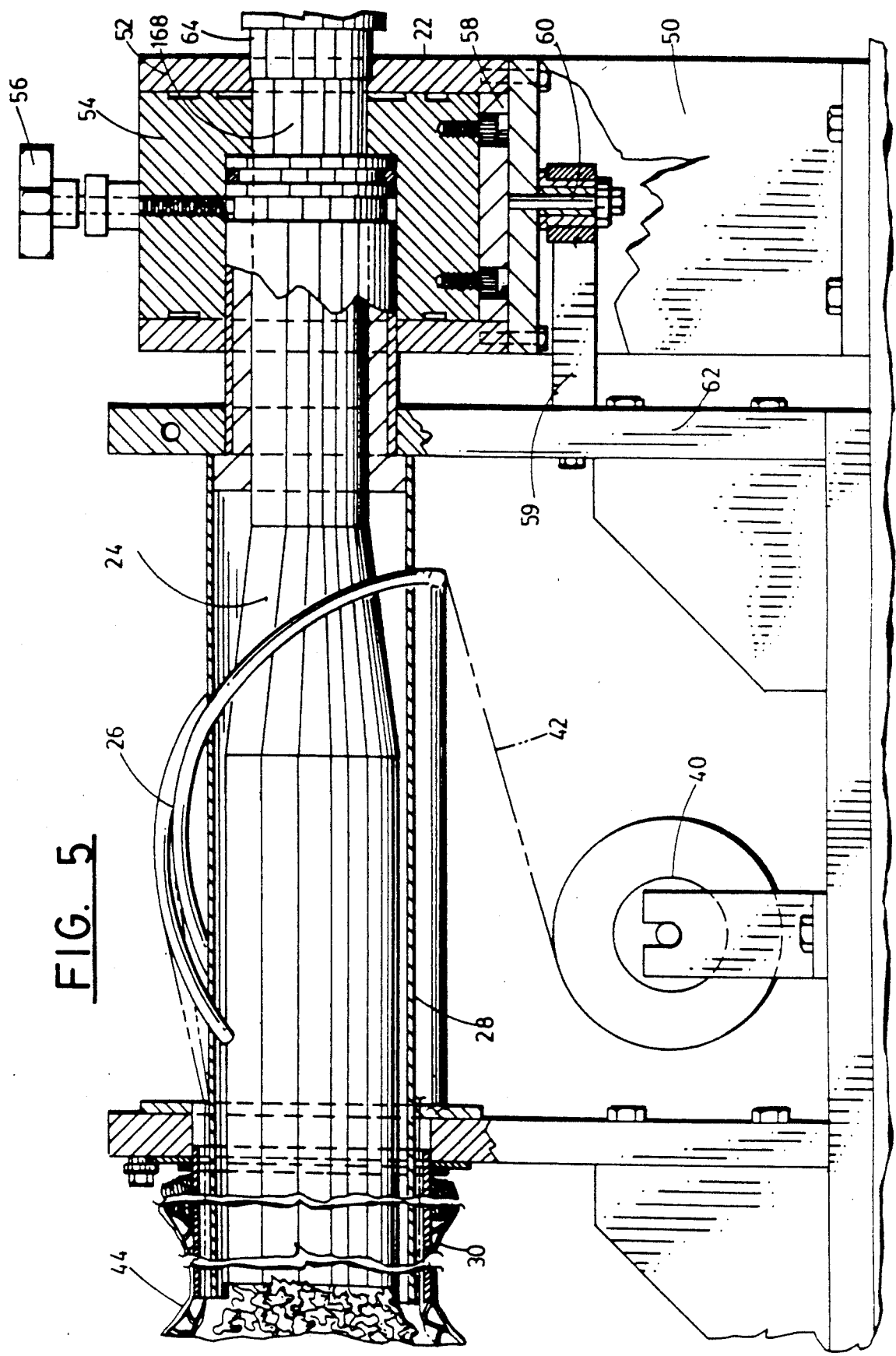
FIG. 5 is a vertical cross-section view of the apparatus as in FIG. 4.
Figure 9:
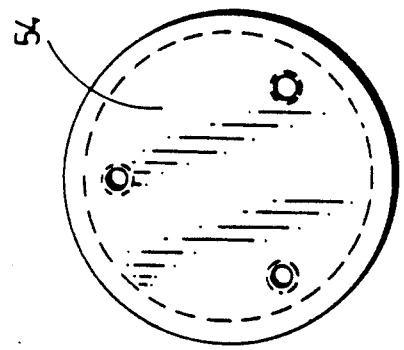
FIG. 9 is a bottom end view of the manifold element of FIG. 7.

Referring to FIG. 5, details of the manifold assembly 22 include an upright base member 50 supporting a pivot cylinder 52. The base member 50 is affixed to the base 20 by bolts or the like, and the pivot cylinder 52 is affixed to the base member 50 by similar bolts. Within the pivot cylinder 52, a manifold pivot 54 pivots under manual operation. A plate 58 is affixed to pivot 54 under pivot 54 and provides a wear surface and braking function. Pivot pin 60 extends downward from the top plate of base 50 and provides a pivot axis about which plate 59 pivots. Pivoting of the cylinder 52 pivots support assembly 62, plate 59 and all horns, netting and collagen film. A horn and tube support assembly 62 comprised of bolted steel plates and brackets is attached by a bracket 59 from the pin 60, and is pivotable under action of cylinder 52. The assembly 62 supports the horn 28, tube 24, collar 26, cylinder 30, roll 40 and associated structure. Thus, manual movement pivots the assembly 62 and all supported structure between the operating and servicing positions. Wear strips 130 support the weight of assembly 62.

Figure 7:
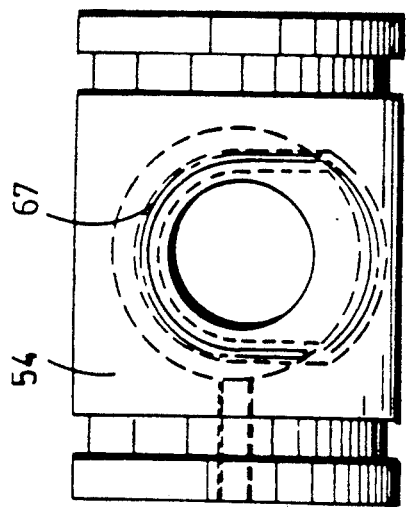
FIG. 7 is a side elevation of a pivot of a manifold assembly.
Figure 8:
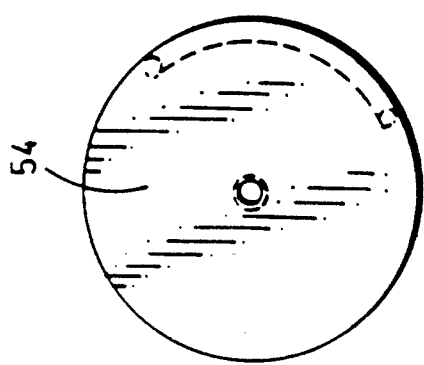
FIG. 8 is a top end view of the manifold element of FIG. 7.
Figure 6:
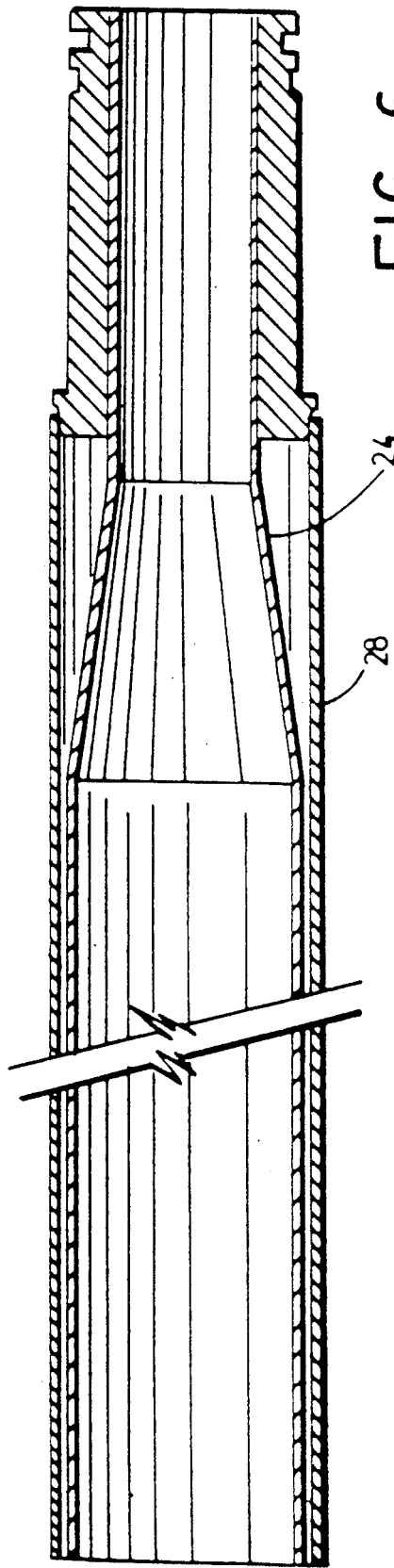
FIG. 6 is a vertical cross-section view of a product discharge tube, discharge horn assembly as in FIG. 5.
Figure 11:
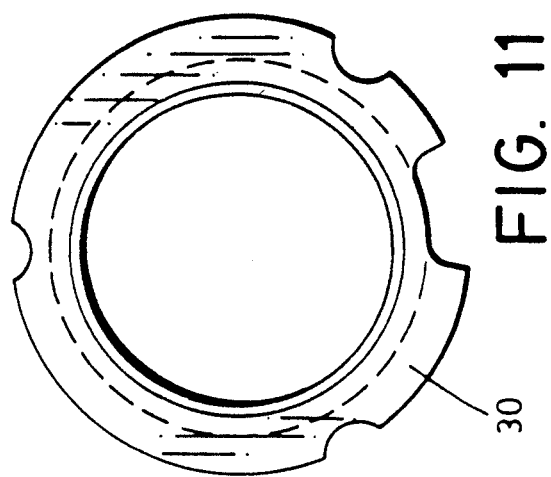
FIG. 11 is an end view of the cylinder of FIG. 10.
Figure 12:
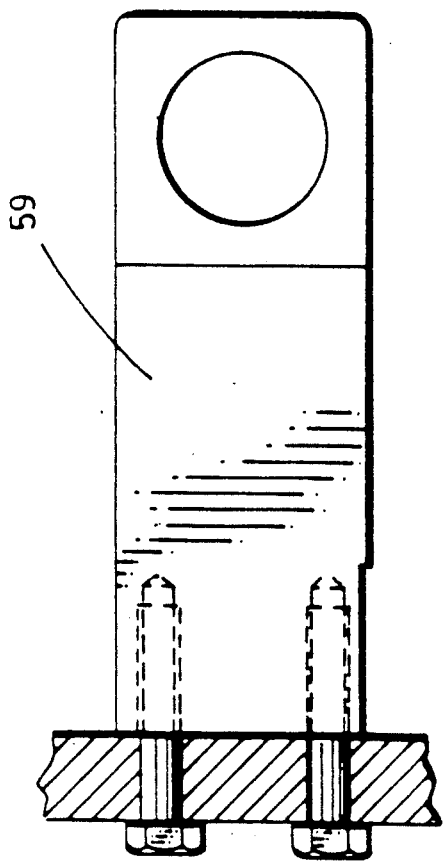
FIG. 12 is a top plan view of a mounting bracket of the manifold assembly.
Figure 10:
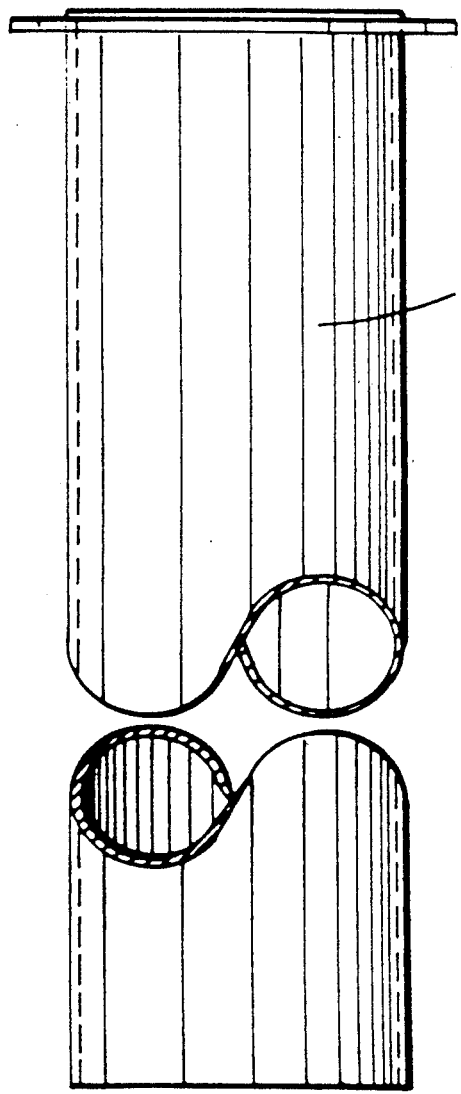
FIG. 10 is a broken, side elevation view of a netting support cylinder.
Figure 13:
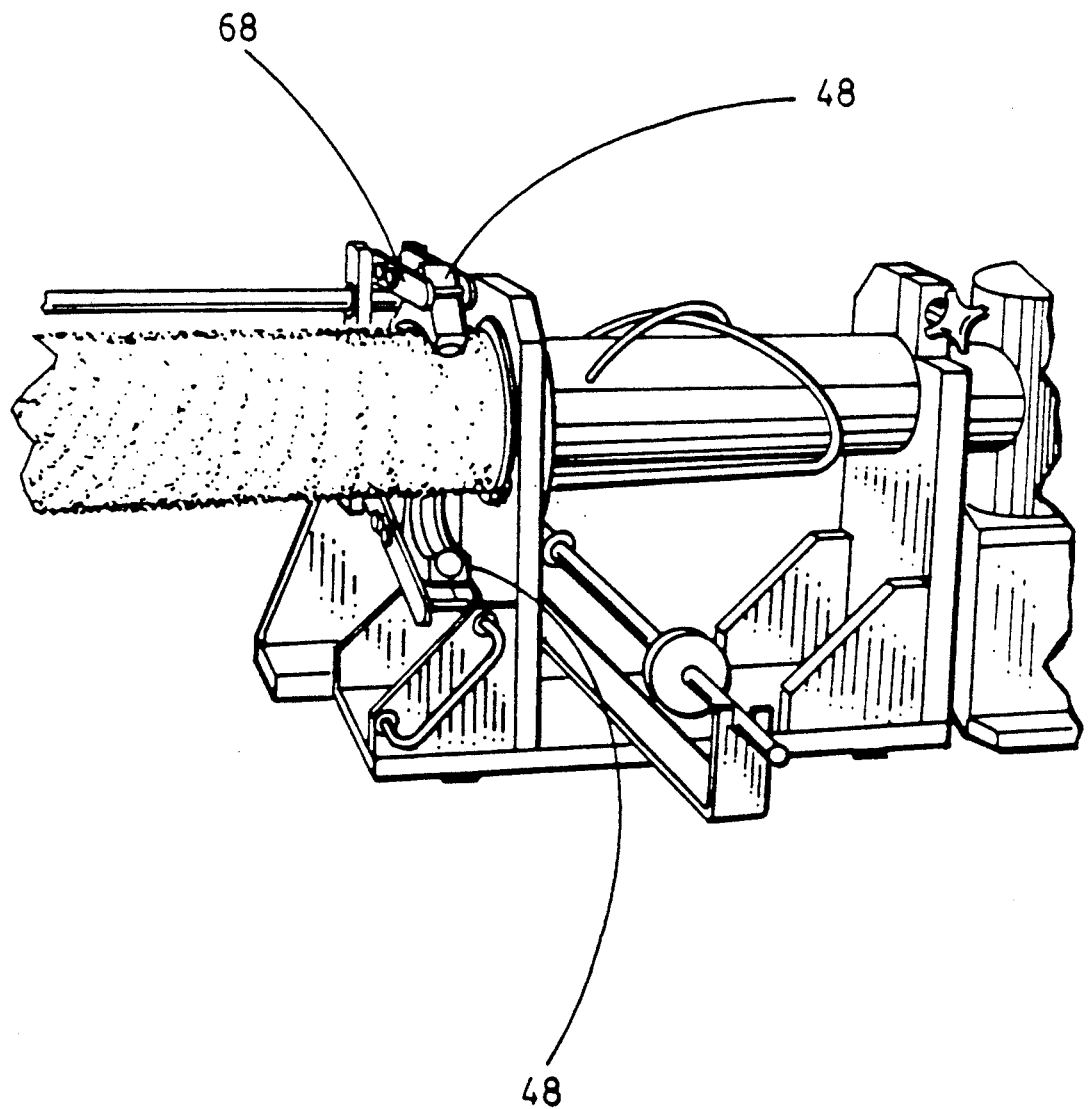
FIG. 13 is a perspective view of the derucker in situ.
Figure 16:
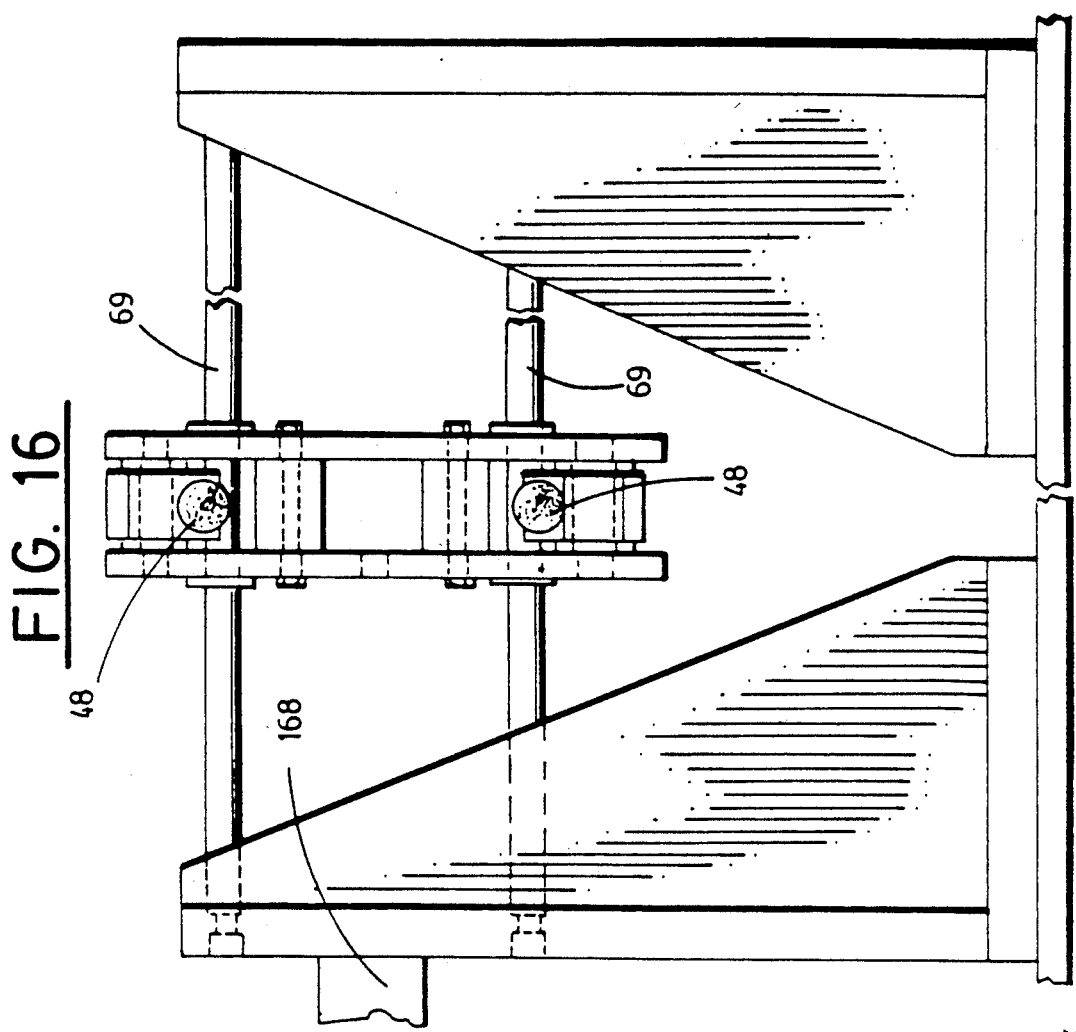
FIG. 16 is a side elevation view of the netting derucker.
Figure 17:
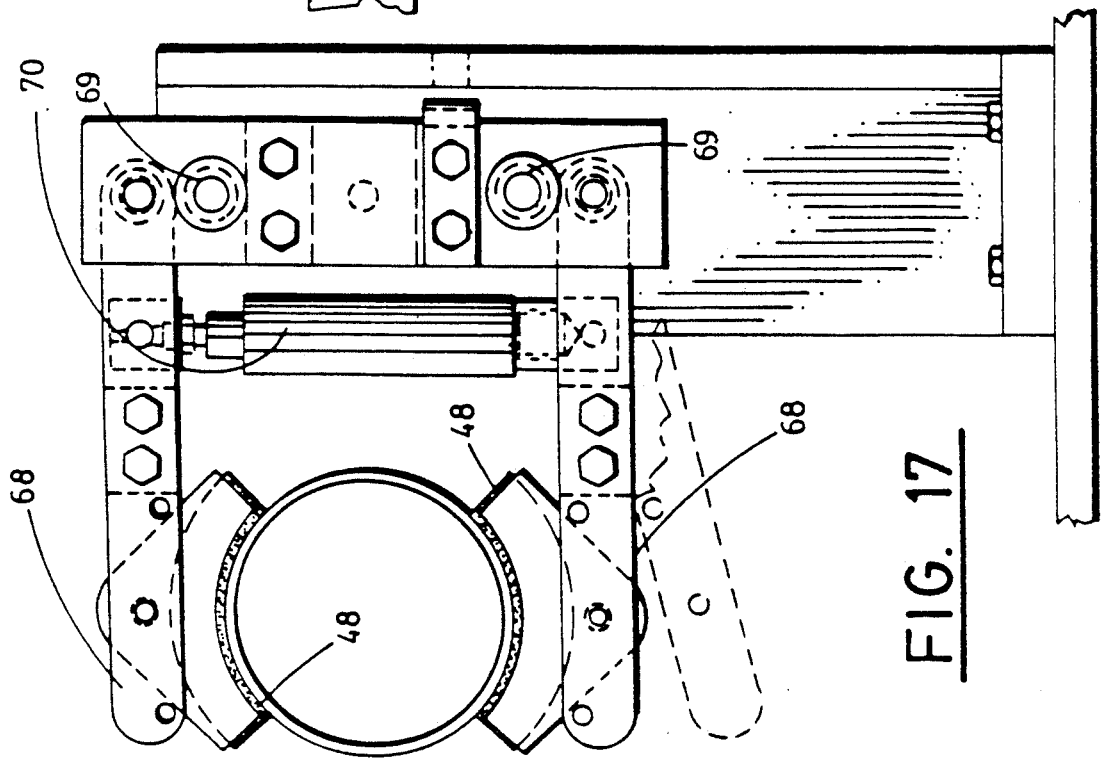
FIG. 17 is a rear elevation view of the netting derucker.
Figure 18:
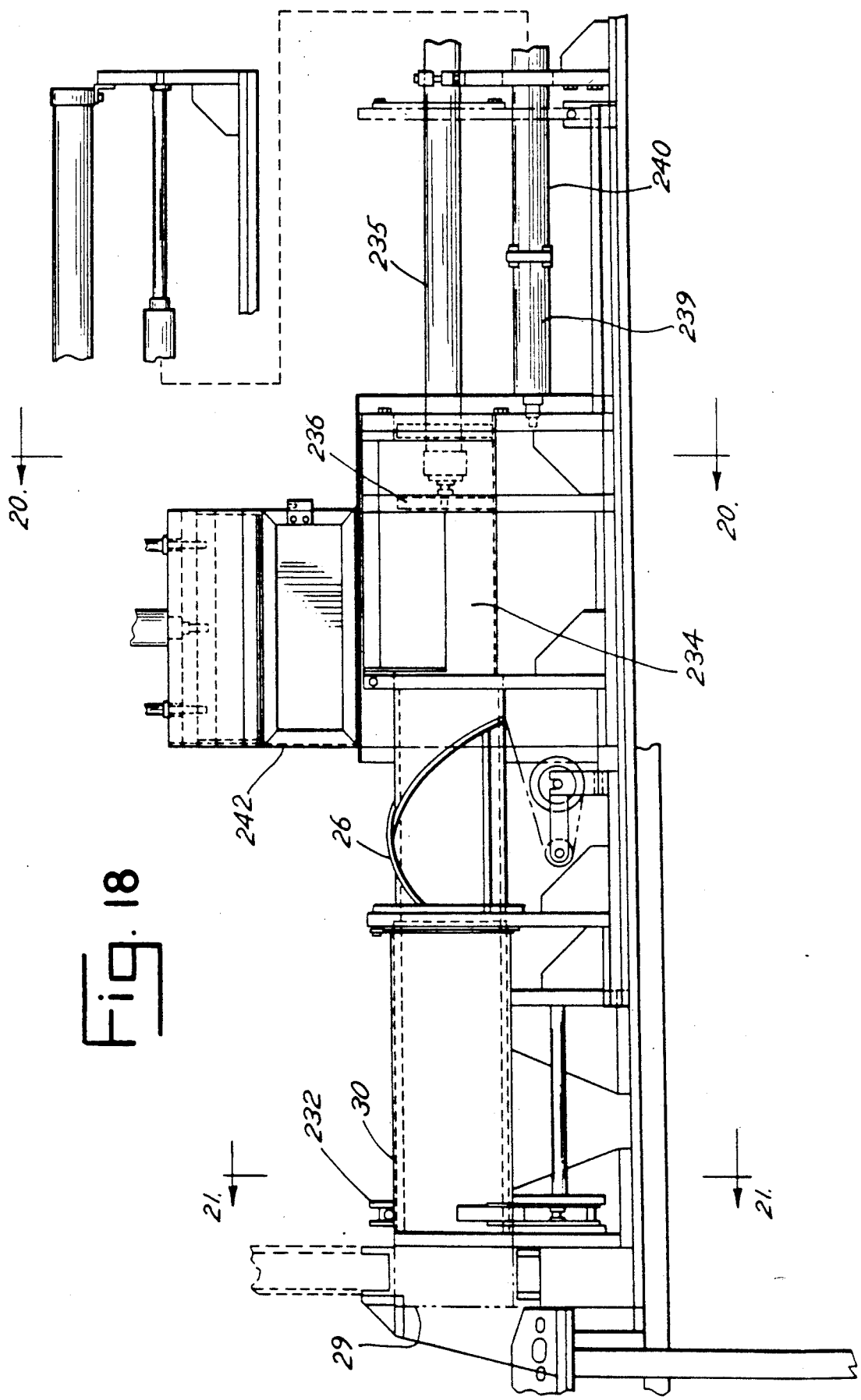
FIG. 18 is a side elevation view of a second preferred embodiment of the invention, broken for drawing convenience.
Figure 19:
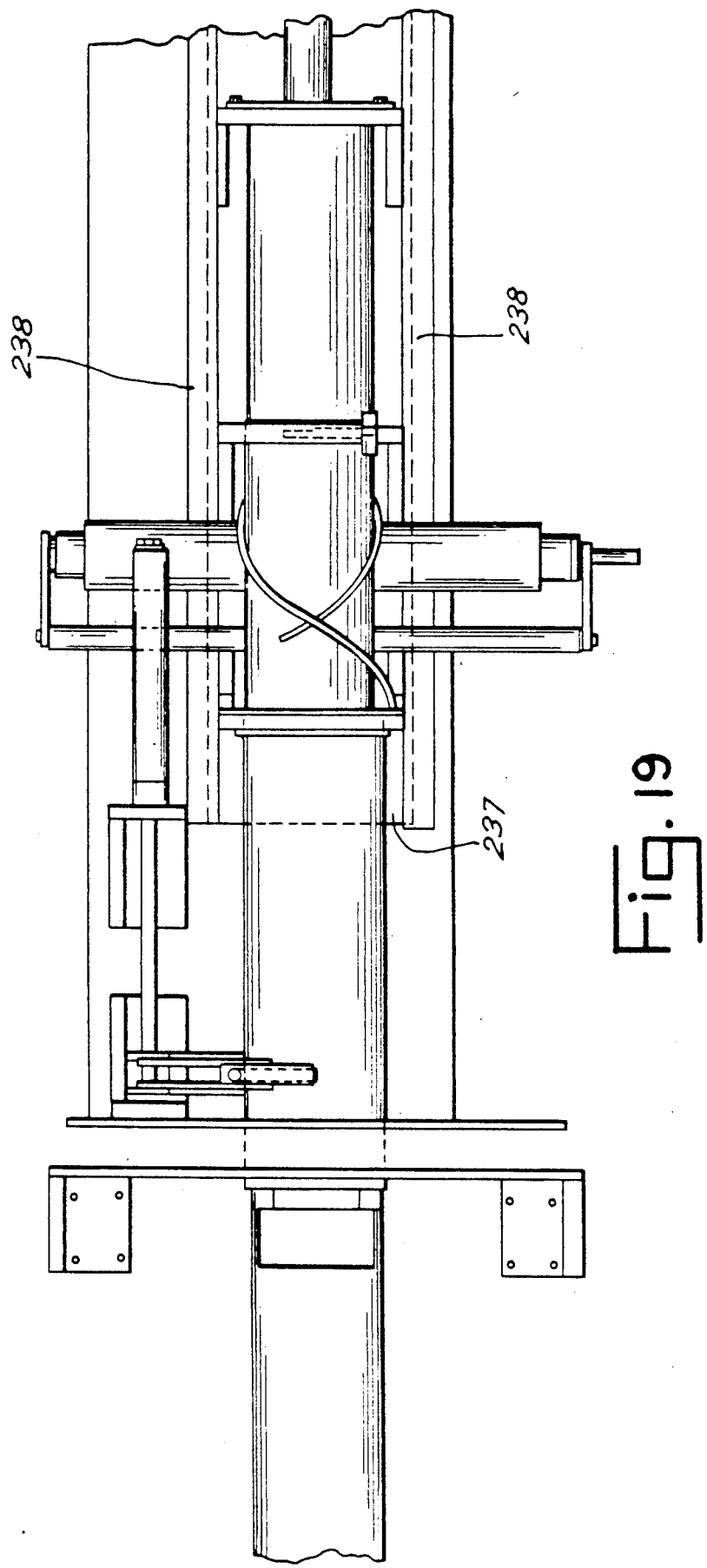
FIG. 19 is a plan view of the second preferred embodiment of FIG. 18.
Figure 20:
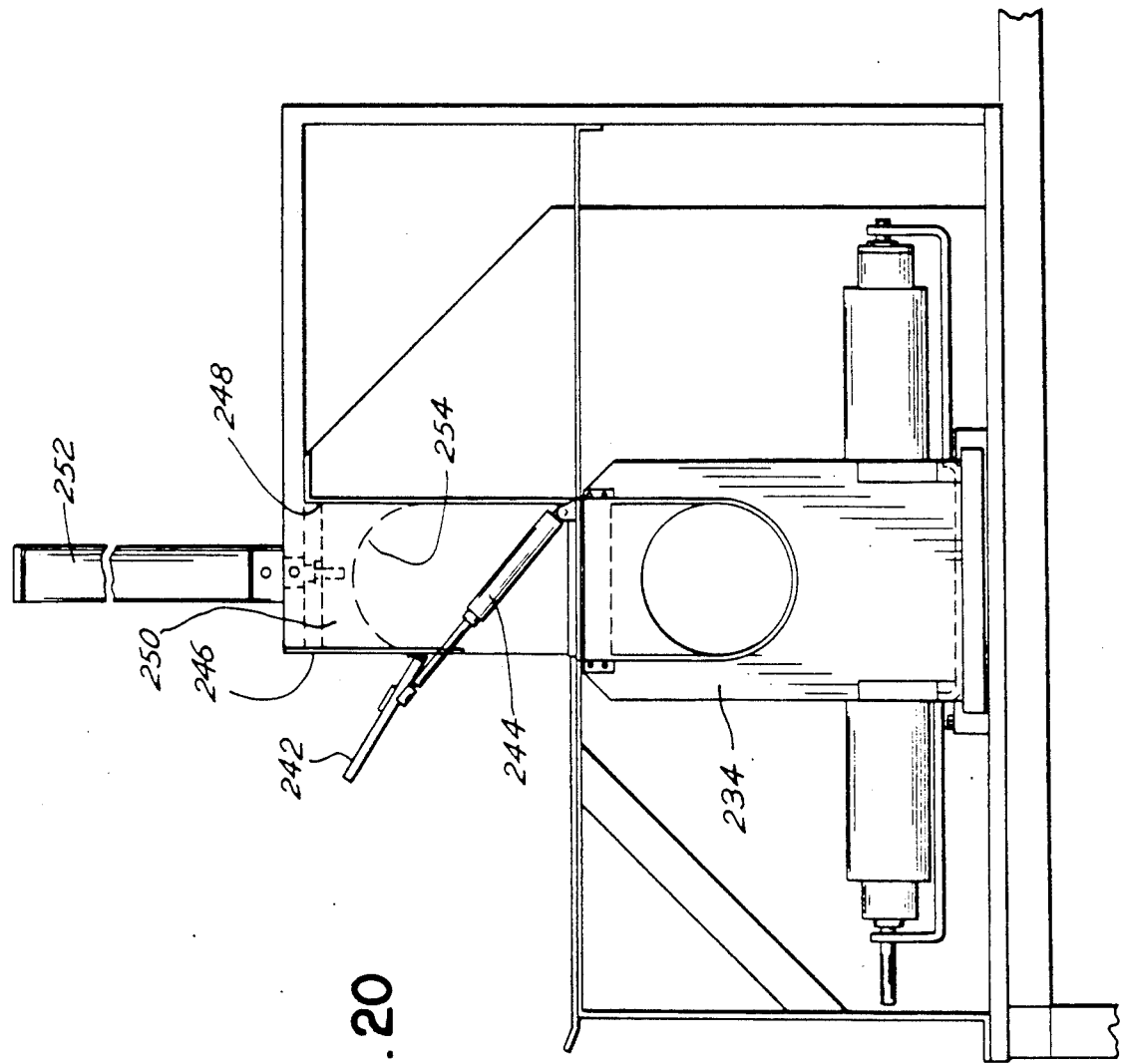
FIG. 20 is a cross-section view taken along line 20—20 in FIG. 18.

Referring again to FIG. 5, the upstream (product movement defining the stream) end of the product discharge tube 24 extends into the manifold assembly, and more specifically extends through the manifold pivot cylinder 52 into the manifold pivot 54. A pump tube 64 extends from manifold pivot cylinder 52 from a direction generally opposite the discharge tube 24. Connecting discharge tube 24 with manifold pivot cylinder 52 is internal port 168. Thus pump tube 64, port 168 and tube 24 provide a pathway by which product meats may be pumped from a pump (not shown) to the discharge end of tube 24 at the clipping end of tube 24. A set screw mounted to the knob 56 secures the tube 24 into the pivot 54, by lodging in an external annular groove of the tube. A seal is placed between the tube 24 and the tube 64. Referring to FIG. 14, pivoting of the tube 24 where it passes through the cylinder 52 is facilitated by an opening 66 in the sidewall of the cylinder 52 which is elongated in the direction of tube pivoting. Referring to FIG. 7, a seal 67 on the pivot 54 is patterned in the shape of the opening 66.

Referring to FIGS. 2, 13, 15 and 16, the derucker fingers 48 are paired, opposed, and each arcuate adjacent the netting 44 on the cylinder 30. Mechanical links 68 support the fingers 48, and under action of a pneumatic cylinder 70, rock the fingers 48 into and out of contact with netting 44. The assembly comprising the fingers 48, links 68 and cylinder 70 is driven parallel to the operating-position axis of the netting supporting cylinder 30, in opposed directions of travel, along guide rods 69 by drive cylinder 120. Movement is coordinated such that the fingers 48 are driven to a position remote from the discharge end of the cylinder 30, rocked into contact with the netting, and driven forward toward the cylinder discharge end while remaining in contact with the netting. The force by which fingers 48 are held in contact with the netting 44 is adjustable and controlled by a regulator (not shown) such that only a portion of the netting will be driven forward toward the clippers 36. The amount of netting 44 driven is dependent upon the air pressure supplied by the regulator to the air cylinder 70 and is equal to tha0 necessary to produce the finished product. A portion of the netting 44 (as preferred, the netting 44 is outwardly layered) is dragged with the fingers 48 as they advance, and left adjacent the discharge end by retraction of the fingers 48. The stated motion is repeated intermittently, as netting is required by product advance.

Under action of the mechanisms of the invention, the collagen film is advanced with uniformity of edge overlap, and product is produced which is uniform of size and condition.

The discharge conveyor 34 is used to draw the product forward at the same rate at which the product is pumped. Without the conveyor the pressure necessary to extract the netting from the horn and to push the product would cause the collagen film to open at the overlap. The surface texture of the conveyor belting is coarse so as to provide positive traction to the product and uniformity of product length. Product weight is controlled by the portion control on the pump.

The end of the conveyor adjacent to the clippers has a height such that it is slightly high. As a result, the product is biased toward the collagen film overlap. This prevents the overlap from opening during the gathering and clipping cycle.

The Second Preferred Embodiment

Figure 21:
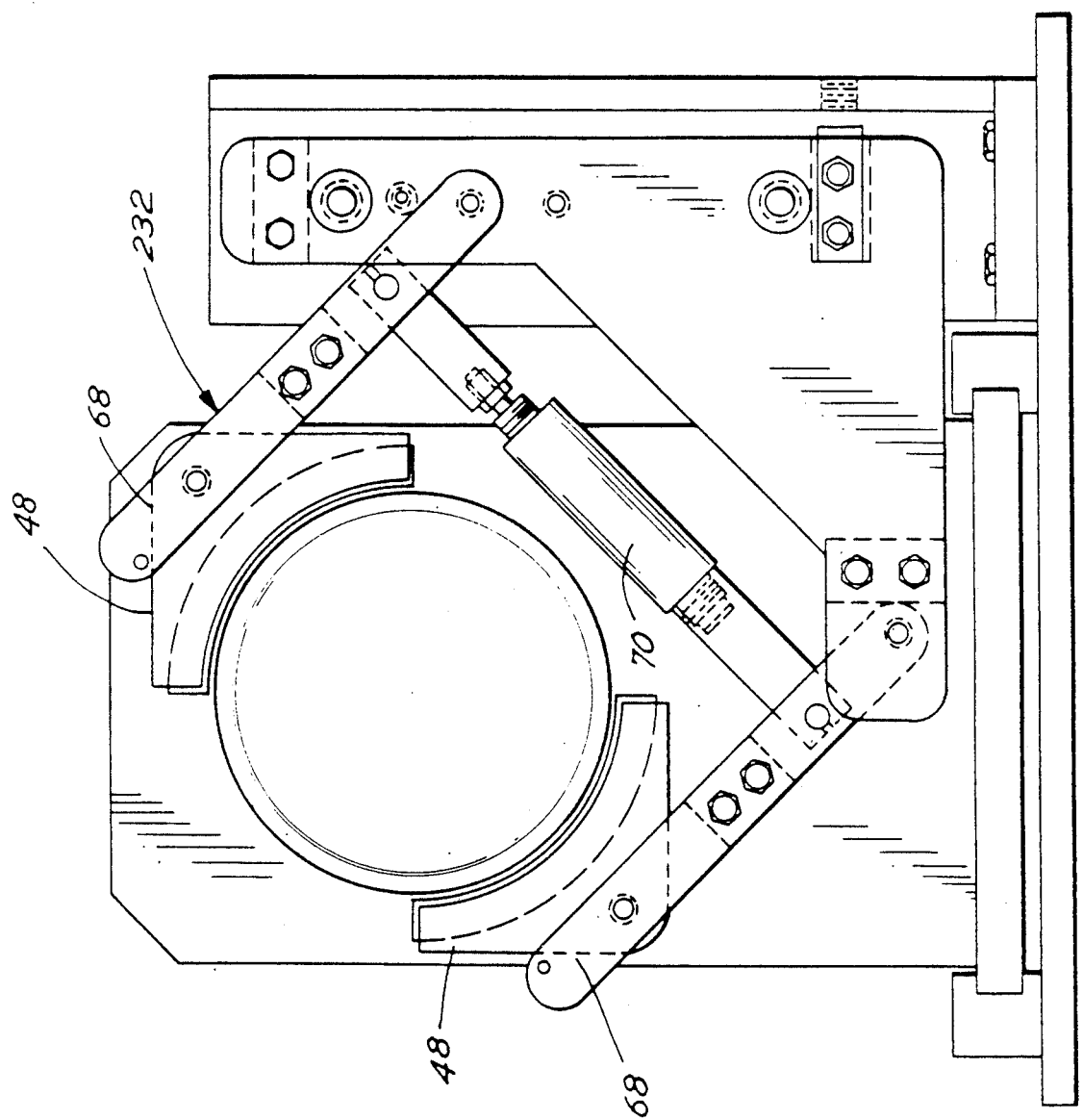
FIG. 21 is a cross-section view taken along line 21—21 in FIG. 18.

Referring to FIGS. 18-33, the second preferred embodiment employs the center product discharge tube 24 of the first preferred embodiment, the collagen forming collar 26, the discharge horn 28, and the netting support cylinder 30. A netting derucker generally 232 in FIG. 21 incorporates the derucking fingers 48, mechanical links 68, cylinder 70 and guide rods 69. The derucker 232 differs from the derucker 32 in a principal aspect by reorienting the fingers 48 to a position forty-five degrees from the fingers 48 of the derucker 32.

The second preferred embodiment is specifically adapted to whole muscle products which do not flow as comminuted material. As a result, the second preferred embodiment deletes the manifold asembly 22. Product is manually introduced to a product chamber 234. The product chamber 234 is in open communication with the center product discharge tube 24, within the chamber 234, toward the collogen forming collar 26. A product ram cylinder 235 is axially aligned with the center product discharge tube 24. The product ram cylinder 235 drives a product ram plate 236 through the chamber 234, through the center product discharge tube 24, to exit therefrom.

The product chamber 234, ram cylinder 235, ram plate 236, collagen forming collar 26, discharge horn 28, and netting support cylinder 30 are mounted atop a slide plate 237. The slide plate 237 axially reciprocates along slide guideways 238 under action of back-to-back double cylinders 239, 240. The slide plate and supported components occupy a filling position (not shown) in which the discharge horn 28 extends through a product opening of the clipper, as shown in phantom outline 29. In the filling position, filling occurs, and the product ram cylinder 235 is actuated, both rods of both cylinders 239, 240 are extended (not shown). The slide plate and supported components occupy a retracted clipping position as in FIG. 18, in which clipping occurs, when only one of the cylinders 239, 240 is extended. The slide plate and supported components occupy a further retracted servicing position, in which netting is loaded, when both cylinders 239, 240 are retracted.

In the retracted, clipping and servicing positions, product cannot be introduced to the product chamber 234. In the advanced, filling position, the product chamber aligns under a hinged product entrance door 242, which, when open, provides manual access to the chamber 234. The door 242 opens and closes under operation of a product door cylinder 244, shown in FIG. 20. Fixed guards such as 246, 248 extend above the chamber 234, and a product chamber lid 250 is poised above an open top of the chamber 234. The lid is downwardly reciprocable under action of a lid cylinder 252. The lid 250 has an inwardly concave, and more specifically, inwardly semicircular lower edge 254. The lid is reciprocated downward onto loaded product, to compress the product, drive out entrapped air, and cause the top of the product to match the contour of the product discharge tube 24. Still in the filling position, the ram cylinder 235 then advances product through the horn.

As with the first preferred embodiment, the mechanisms of the second preferred embodiment are under the control of the cylinders stated, and controls (not shown) which co-ordinate mechanisms for safety and desirable speed.

Figure 22:
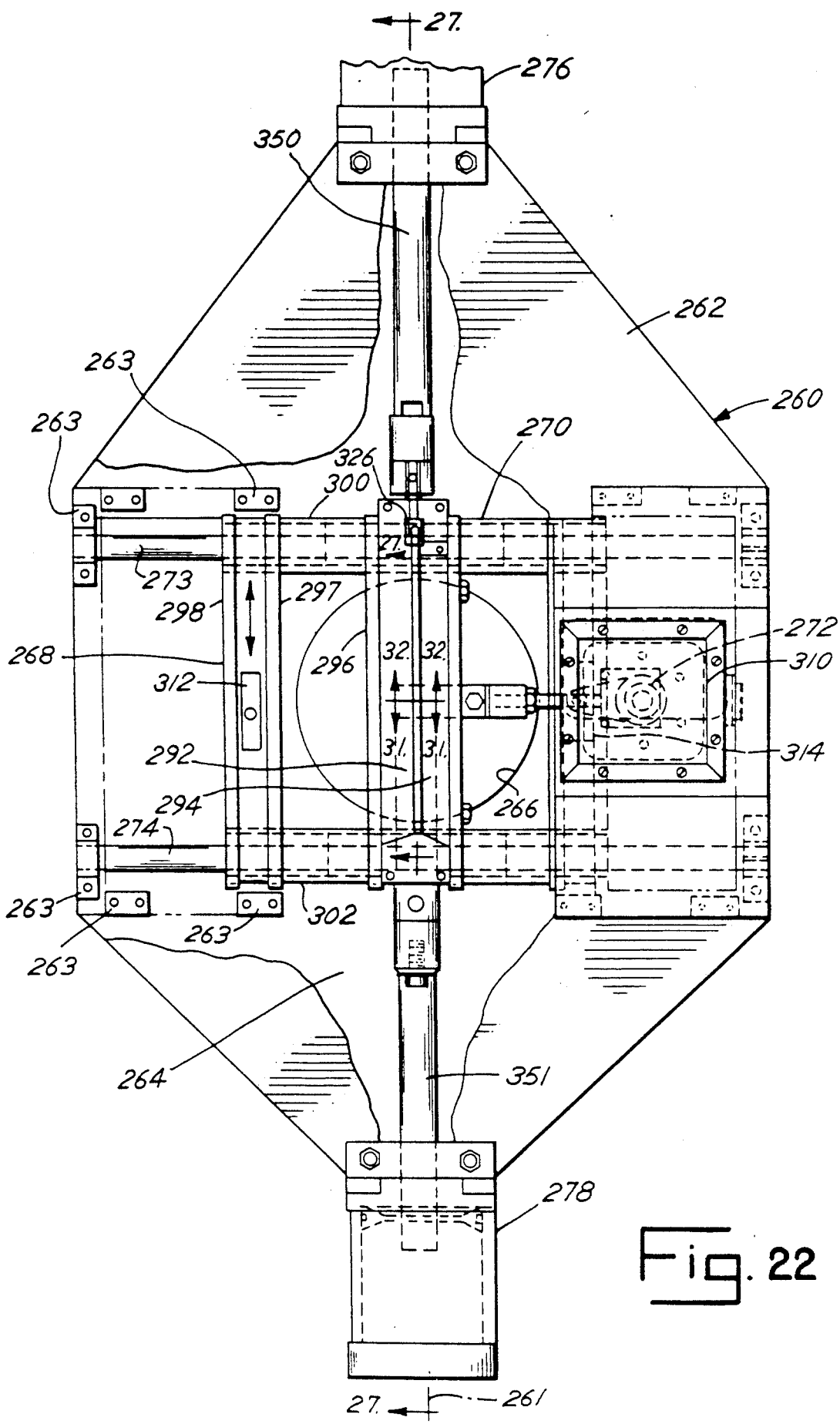
FIG. 22 is a partially broken away side elevation view of a clipper of the second preferred embodiment.
Figure 23:
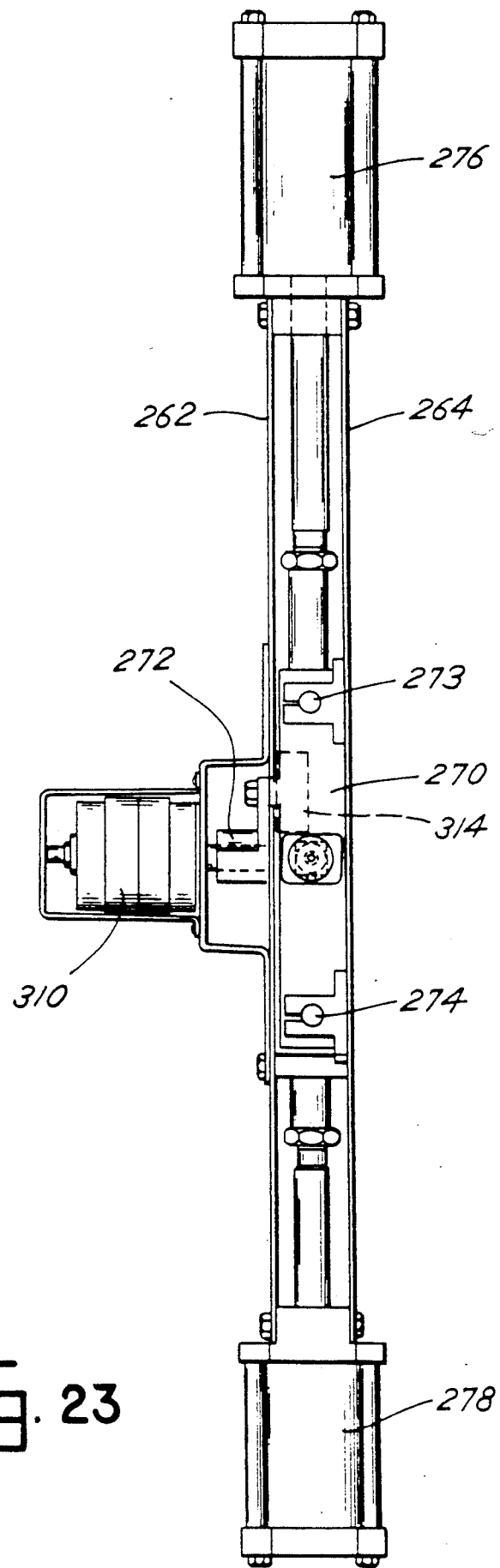
FIG. 23 is an end elevation view of the clipper of FIG. 22 taken from the right in FIG. 22.
Figure 24:
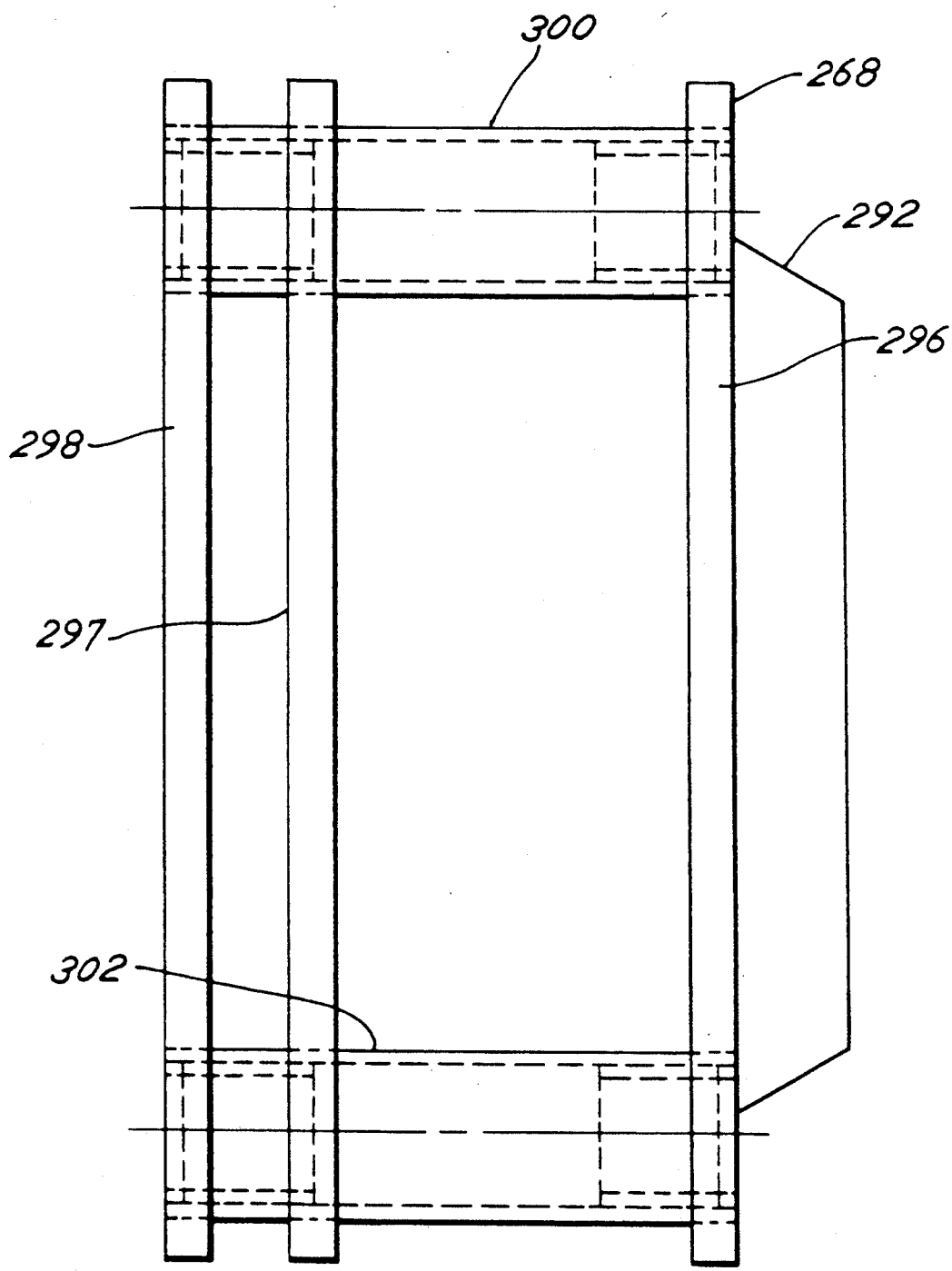
FIG. 24 is a side elevation view of a gathering jaw assembly of the clipper separated from the clipper.
Figure 25:
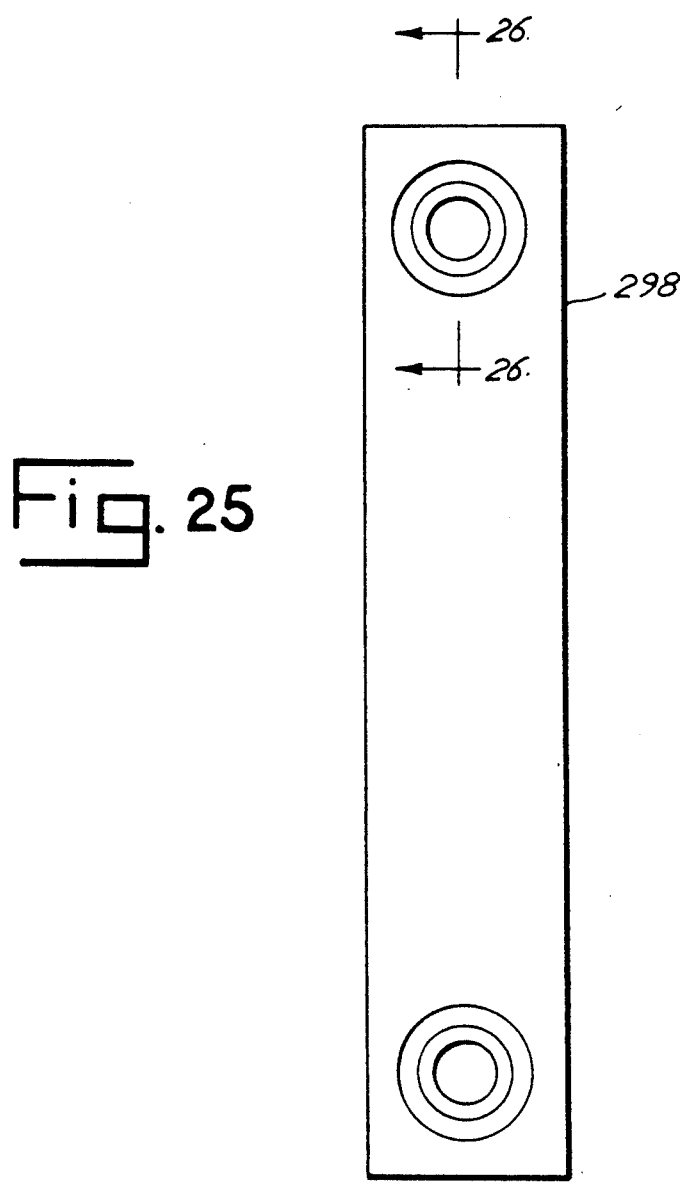
FIG. 25 is an end elevation view of the gathering jaw assembly of FIG. 24.
Figure 26:
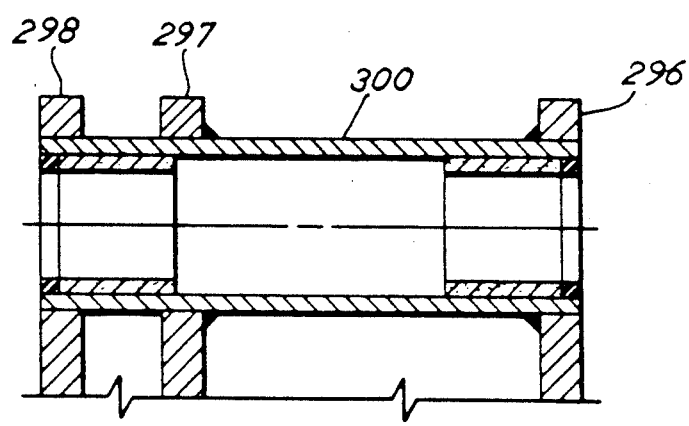
FIG. 26 is a cross-section view taken along line 26—26 in FIG. 25.

Referring to FIGS. 22 through 33, the clipper 260 of the second preferred embodiment includes two parallel, coextensive plates 262, 264 which support and define the overall clipper. The plates 262, 264 are spaced by interposed spacing blocks 263 about their perimeters and stress areas. The plates 262, 264 define a pair of coextensive, centered product openings such as opening 266 in FIG. 22. (To the left of centerline 261 in FIG. 22, the edge of opening 266 is the edge in the rear plate 264; to the right, the edge of opening 260 is the edge in the forward plate 262.) The plates 262, 264 are aligned relative to the product discharge horn 28 transverse to the direction of product flow through the horn. Thus, as shown in FIG. 22, the clipper 260 is seen generally in transverse elevation view.

A pair of opposed gathering jaw assemblies 268, 270 are mounted for transverse, linear reciprocation along Thompson rods 273, 274 mounted between the plates 262, 264. As shown in FIG. 22, jaws 292, 294 of the assemblies 268, 270 are closed. The gathering jaw assemblies 268, 270 are reciprocated under action of pivoting eccentrics such as eccentric 272. The eccentrics are driven by rotary actuators such as representative actuator 310. The eccentrics directly drive slide blocks 312, 314, which slide between the cam plates 297, 298, to convert pivoting motion of the eccentrics to linear motion of the gathering jaw assemblies. The gathering jaw assemblies gather product material located between the jaws 292, 294 ahead of the jaws 292, 294 into the path of punches and dies, to be described. The eccentric arrangement of the clipper 260 precisely controls the foremost position of advance of the jaws 292, 294. No stops to limit motion are required. The eccentrics also accelerate and decelerate linear motion of the gathering jaw assemblies 268, 270 such that the jaws 292, 294 are substantially decelerated as they approach their foremost position, and are readily advanced after being retracted.

Along inner edges, the jaws 292, 294 define punch and die channels. Referring to FIGS. 22 and 24-26, a representative gathering jaw assembly 268 includes a jaw 292, a jaw mounting plate 296, and a pair of spaced, parallel cam plates 297, 298. All three plates 296, 297, 298 are fixed to spaced, transverse support tubes 300, 302. The tubes 300, 302 ride on the Thompson rods 273, 274.

Referring to FIGS. 27-30, a representative jaw 292, shown as seen from line 27—27 in FIG. 22 defines paired, parallel punch channels 316, 318 and paired, parallel die channels 320, 322. The punch channels and die channels meet at the center of the jaw members. A knife slot 324, located in jaw member 292 only, is centered between the die slots 292, 294.

Figure 31:
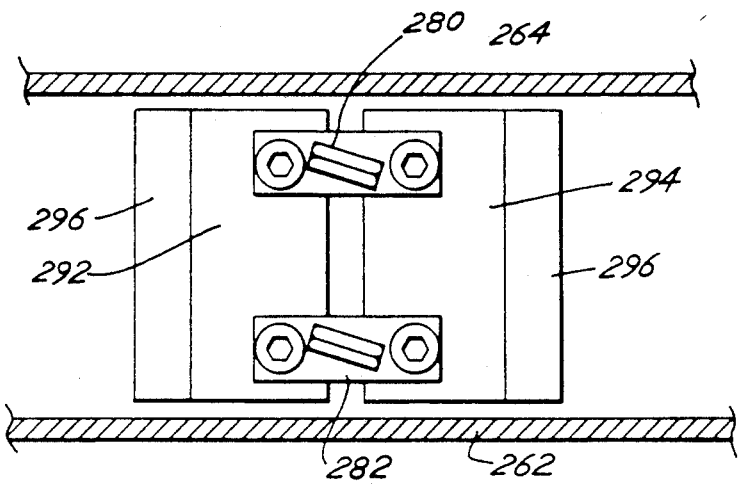
FIG. 31 is a partial cross-section view taken along line 31—31 in FIG. 22.

At right angles to the jaw members 268, 270, the clipper 260 includes elongated, linearly reciprocable punches and linearly reciprocable dies. The punches are driven under action of a punch drive rod 350 by a pneumatic actuator 276, and the dies are driven opposite the punches under action of a die drive rod 351 by a pneumatic actuator 278. Referring to FIG. 33, dies 280, 282 are shown as retracted, viewed from above a Thompson rod 274. When retracted, the punches occupy similar positions. Referring to FIG. 31, the dies 280, 282 are shown as advanced, retained within the die channels 320, 322 of the jaw members 292, 294. The punches are shown advanced in FIG. 32. Motion of the punches and dies is co-ordinated with motion of the gathering jaw assemblies 268, 270 such that the jaw members 292, 294 close first, and then the punches and dies meet at the center of the clipper 260, along the punch and die channels 316, 318, 320, 322 formed by the inner edges of the jaw members. The punches drive metal clips, introduced at clip windows such as window 326, to the dies. The punches and dies finalize the gathering of product end materials begun by the advance of the jaw members 292, 294, until the clips driven by the punches are deformed against the dies to define closures about the gathered ends of products.

Figure 32:
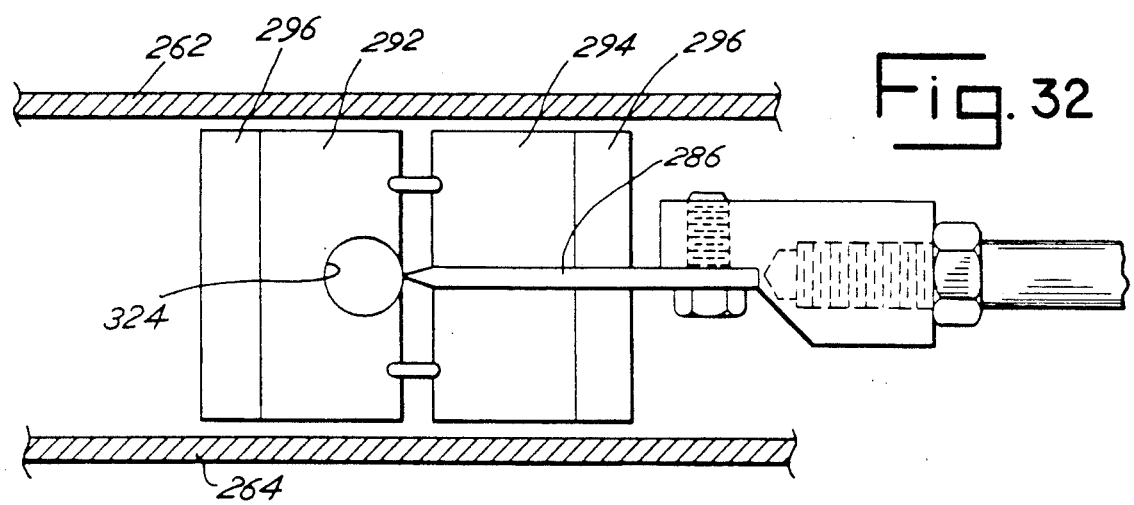
FIG. 32 is a partial cross-section view taken along line 32—32 in FIG. 22.
Figure 33:
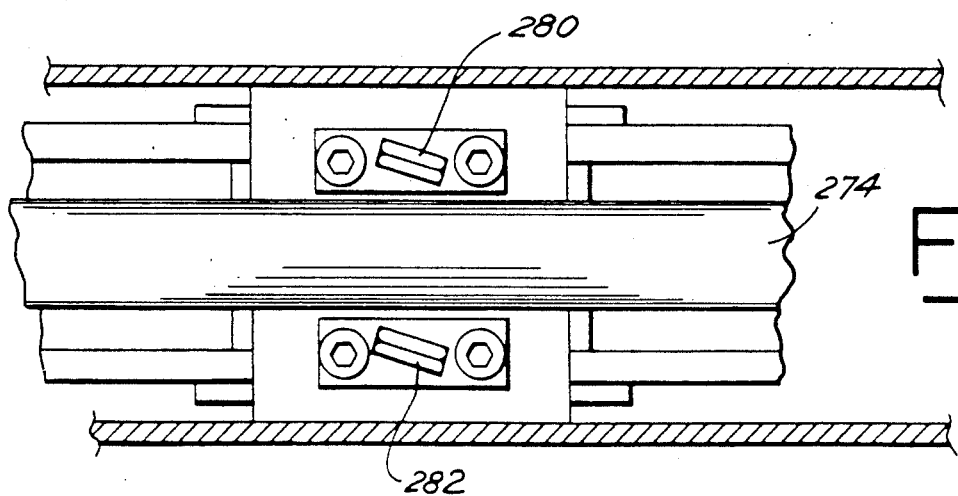
FIG. 33 is a detail view similar to FIG. 31 showing dies of the clipper in retracted position.

As in FIG. 32, a reciprocal cut-off knife 286 extends between the plates 262, 264. The knife is advanced to cut between clips, to free completed product from remaining neeting and collogen which forms the end of a next product.

Conclusion

The invention and its preferred embodiments are now described in sufficiently clear, concise and exact terms that a person of ordinary skill in the art of the invention could make and use the invention. The preferred embodiments are illustrative of the invention, and the invention may be practiced without slavish copying of the preferred embodiments. Therefore, to particularly point and claim the subject matter regarded as invention, claims conclude this specification.

What is claimed is:

1. Apparatus for simultaneously advancing a product material, placing a collagen film from a flat sheet of the collagen film about the outside circumference of the product material, and placing a netting about the outside circumference of the product material and collagen film, the apparatus comprising:

a base;

a manifold assembly mounted to the base, through which the product material advances;

a center product discharge tube, through which the product material advances, extending from the manifold assembly;

collagen forming collar means for forming the flat sheet into a cylindrical shape;

the collagen forming collar means concentric with the discharge tube and mounted in association therewith to the base;

a discharge horn extending along at least a first portion of the discharge tube away from the manifold assembly and mounted in association with the discharge tube, the discharge horn concentric with and outside the first portion of the discharge tube, the collagen film advancing along the outside of the discharge horn after leaving the collagen forming collar means;

a netting support cylinder concentric with and outside at least a second portion of the discharge tube and discharge horn;

the netting support cylinder and discharge horn, away from the manifold assembly, terminating substantially coterminally, the netting support cylinder mounted in association with the discharge tube and discharge horn to the base;

whereby product material flows through the manifold assembly and product discharge tube and collagen film and netting is simultaneously placed about the product as product material exits the product discharge tube.

2. Apparatus as in claim 1 further comprising clipper means adjacent the product discharge tube and discharge cylinder for voiding portions of the product upon exit of product from the product discharge tube and for clipping product ends in the voided portions.

3. Apparatus as in claim 1 further comprising netting derucking means for derucking netting from the netting support cylinder, the derucking means mounted in association with the netting support cylinder.

4. Apparatus as in claim 3 in which the derucking means further comprises means for derucking netting from the netting support cylinder by intermittently contacting portions of the netting and transporting the netting portions along the netting support cylinder away from the manifold assembly.

5. Apparatus as in claim 1 in which the product discharge tube, discharge horn and netting support cylinder are mounted in association with the base and manifold assembly to swing between an operating position and a servicing position.

6. Apparatus as in claim 1 further comprising a power conveyor mounted adjacent the product exiting the product discharge tube and discharge horn for conveying product from the apparatus.

7. Apparatus for simultaneously advancing discrete products, placing a collagen film from a flat sheet of collagen film about the outside circumference of the products and placing netting about the outside circumference of the collagen film and products, the apparatus comprising:
  a base;
  an axial slide assembly mounted to the base;
  a product chamber on the slide assembly;
  a product chamber ram extending into the product chamber, on the slide assembly;
  a center product discharge tube extending from the product chamber through which the products advance under action of the ram;
  collagen forming collar means for forming the flat sheet into a cylindrical shape;
  the collagen forming collar means concentric with the discharge tube and mounted in association therewith to the base;
  a discharge horn extending along a portion of the discharge tube away from the product chamber and mounted in association with the discharge tube, the discharge horn concentric with and outside the portion of the discharge tube, the collagen film advancing along the outside of the discharge horn after leaving the collagen forming collar means;
  a netting support cylinder concentric with and outside at least a second portion of the discharge tube and discharge horn;
  the netting support cylinder and discharge horn, away from the product chamber, terminating substantially coterminally, the netting support cylinder mounted in association with the discharge tube and discharge horn to the base;
  whereby products are introduced through the manifold assembly and driven through the product discharge tube, and a collagen film and netting are simultaneously placed about the products as the products exits the product discharge tube.

8. Apparatus as in claim 7 further comprising a product compressor mounted for compressing product in the product chamber to the contour of the product discharge tube.

* * * * *